J. L. MAHONEY.
APPARATUS FOR VULCANIZING RUBBER ARTICLES.
APPLICATION FILED MAY 21, 1917.
1,295,087.
Patented Feb. 18, 1919.
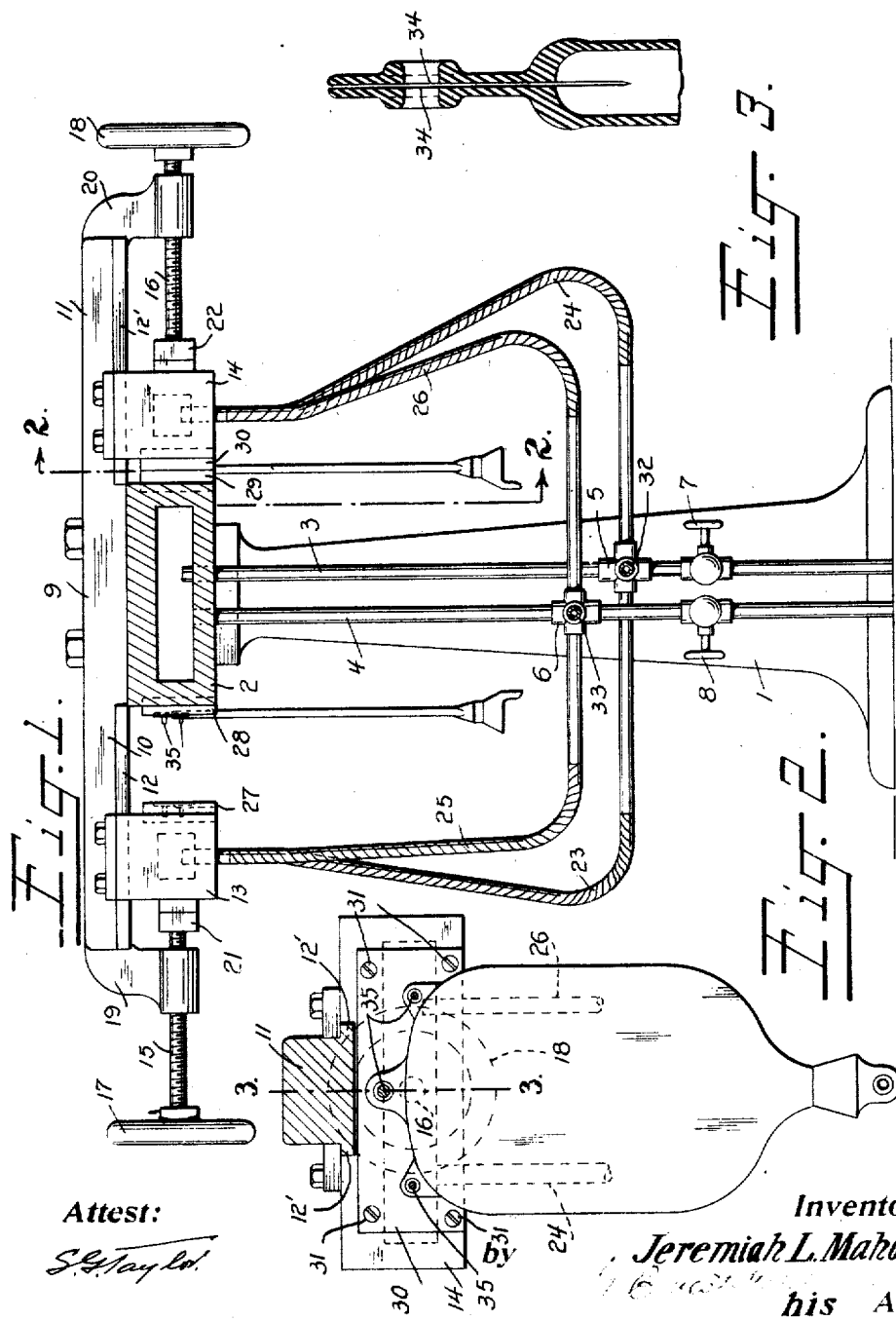
Attest:
S. G. Taylor
Inventor:
Jeremiah L. Mahoney,
by
his Atty.

UNITED STATES PATENT OFFICE.

JEREMIAH L. MAHONEY, OF NEW HAVEN, CONNECTICUT, ASSIGNOR TO THE GOOD-YEAR'S INDIA RUBBER GLOVE MANUFACTURING COMPANY, A CORPORATION OF CONNECTICUT.

APPARATUS FOR VULCANIZING RUBBER ARTICLES.

1,295,087.   Specification of Letters Patent.   Patented Feb. 18, 1919.

Application filed May 21, 1917. Serial No. 169,819.

*To all whom it may concern:*

Be it known that I, JEREMIAH L. MAHONEY, a citizen of the United States, residing at New Haven, county of New Haven, State of Connecticut, have invented certain new and useful Improvements in Apparatus for Vulcanizing Rubber Articles, of which the following is a full, clear, and exact description.

My invention relates to apparatus for vulcanizing rubber articles, and particularly those in which a final vulcanization or cure is given to a portion of the article, the main body of the article having been molded or cured in another mold by the use of heat in the usual way. My invention is particularly adapted for closing or securing together the margins of a hot water bottle about an opening through which a core has been removed after the bottle has been molded, and cured partly in a forming mold.

My invention is directed for use in the manufacture of rubber articles, such for instance as described in my co-pending applications Serial Nos. 169,818 and 211,904 and the specific embodiment here shown more directly relates, for convenience of illustration, to the type of bottle shown in the former of the above mentioned two applications.

For a detailed description of the form of invention which I at present deem preferable, reference may be had to the following specification and to the accompanying drawings forming a part thereof, in which:

Figure 1 is a side elevation of my improved apparatus, showing the central portion thereof in cross-section;

Fig. 2 is a sectional view thereof showing movable steam-heated platen, and taken substantially on the line 2—2, Fig. 1;

Fig. 3 is a sectional view of the end of a water bottle indicating the opening through which the core has been removed which is to be closed by final vulcanization and taken substantially on the line Fig. 2.

Referring to the drawing, the numeral 1 indicates a suitable standard upon the top of which is mounted a hollow platen 2 which is adapted to be heated by the steam supply pipe 3 and from which extends the drain or outlet pipe 4. These pipes are provided with suitable unions 5 and 6, respectively, hereafter to be referred to, and also with suitable valves 7 and 8 for controlling the supply of steam and exhaust. Attached to the top of the platen 2 is a yoke 9 having laterally extending arms 10 and 11 having on their sides the flanges 12 and 12' forming guides for the movable platens 13 and 14, which are adapted to slide longitudinally on the under side of said arms. The movement of the movable platens 13 and 14 is controlled by screws 15 and 16 operated by hand wheels 17 and 18. These screws pass through threaded openings or bearings in downwardly extending lugs 19 and 20, the ends of the screws 15 and 16 being attached to the platens 13 and 14 by means of the bearing blocks 21 and 22. The platens 13 and 14 are hollow, and are adapted to be heated by steam which is supplied through the pipes 23 and 24 which are connected with the union 5 on the steam supply pipe 3. The platens 13 and 14 are also drained by means of pipes 25 and 26 connected with the union 6 on the exhaust pipe 4. The pipes 23, 24, 25 and 26 consist preferably of flexible tubes of rubber or other suitable material for at least a portion of their lengths to permit movement of the platens 13 and 14. The lateral faces of the platen 2 and the inner faces of the platens 13 and 14 are preferably recessed so that the mold members 27 and 28, 29 and 30, may be seated therein and held in position by suitable means, such as by the machine screws 31. These mold members being thus made removable, enable a variety of molds of different shapes and sizes to be used without otherwise altering the apparatus to adapt it to different sizes and types of articles. The platen 2 may be made of any desired length, so that a plurality of sets of movable platens may be supported thereon, thus enabling one installation to be utilized for simultaneous curing of a plurality of articles up to two dozen, more or less. In such case only one set of pipes 3 and 4 are necessary to supply steam to the central platen 2, and in order to heat the various sets of movable platens, horizontally extending pipes are provided communicating with the unions 6 and 7, as indicated at 32 and 33, which are provided with similar unions at various points to enable supply pipes similar to 23, 24, 25 and 26 to be connected therewith for the corresponding sets of movable platens.

In Fig. 3 I have shown the end of a water bottle in section, and indicated the opening between the side portions of a tab or loop and between the margins of the opening which is to be closed, by the numerals 34. The mold members 27, 28, 29 and 30 are provided with suitable dowel pins, such as 35, over which the tabs or loops formed upon the article to be cured, are passed, thus retaining the article in place within the mold when hanging vertically, as indicated in the figures of the drawings.

It is particularly advantageous to cure some articles in this position, inasmuch as the rubber is not distorted and the parts thereof displaced during the heating process, thus giving an accurate registry and allowing the article to be cured in the desired final form. Heretofore in the art relating to vulcanization of rubber, vulcanizing presses have been provided with horizontal platens on which the mold members are laid. Such presses are not adapted for vulcanizing small portions only of articles, since the unconfined portions thereof depend from the mold members which are horizontally placed, thereby causing displacement of the parts and bending the rubber at a sharp angle so that after vulcanization permanent distortion is produced. The principal object of this invention is to obviate such distortion and to permit rubber articles to be cured in a vertical position.

In the use of my improved apparatus, the platens are first heated by steam by the necessary manipulation of the valves 7 and 8. The movable platens are then separated from the stationary platens by manipulating the hand wheels 17 and 18. The articles to be cured, which in this case are shown to be hot water bottles, are placed in position in the respective mold members 27 and 28, and 29 and 30 by being suspended from the respective dowel pins 35, clearly shown in Figs. 1 and 2. The movable platens 13 and 14 are then closed and forcibly pressed together by turning the hand wheels until the parts are arranged as indicated at the right hand of Fig. 1. The curing is then continued for a suitable length of time, depending upon the vulcanizable cement or rubber compound used in the opening between the sides of the bottles. The movable platens are then separated from the stationary platen and the articles removed and finished in any well known manner. The lateral tabs on the end of the bottles, as indicated in Fig. 2, may be cut off or otherwise removed if necessary, those described having been provided to accurately hold the bottles within the mold members during the vulcanizing operation, as more clearly described in my co-pending applications previously referred to.

Having thus described this form of my invention, what I claim and desire to protect by Letters Patent is:

1. Molding and vulcanizing apparatus for rubber articles comprising vertically disposed mold sections forming a mold cavity having an unobstructed mouth opening to permit the rubber article to freely hang vertically therethrough beyond the cavity, means for relatively moving the sections horizontally to and from operable position, and means for heating the mold.

2. Apparatus for curing rubber articles comprising, a fixed platen, a movable platen located laterally thereof, means for moving the latter platen horizontally to and from said fixed platen, means for heating said platens, complemental vertically arranged mold members secured to said platens, and dowel pins carried by said mold members from which said articles are suspended when the mold members are closed and being closed.

3. Apparatus for curing rubber articles comprising, a fixed platen, a plurality of movable platens located laterally thereof, means for moving the latter platens horizontally to and from said fixed platen, means for heating said fixed platen, flexible connections between said heating means and said movable platens for heating the latter, complemental vertically arranged mold members secured to said platens, and dowel pins carried by said mold members from which said articles are suspended when the mold members are closed and being closed.

4. Molding and vulcanizing apparatus for rubber articles comprising vertically disposed mold sections forming a mold cavity having an unobstructed mouth opening to permit the rubber article to freely extend therethrough beyond the cavity, means disposed beyond said mold cavity on the opposite side from said mouth opening for gripping extension portions of the article, said means and cavity being relatively disposed to provide an excessive space therebetween to effect a tension in the article for the purposes as described, means for relatively moving the sections horizontally to and from operable position, and means for heating the mold.

5. Molding and vulcanizing apparatus for rubber articles comprising vertically disposed mold sections forming a mold cavity having an unobstructed mouth opening to permit the rubber article to freely hang vertically therethrough beyond the cavity, means for relatively moving the sections horizontally to open and closed positions, means for supporting the rubber article vertically when the sections are open, and means for heating the mold.

Signed at Naugatuck, Connecticut, this 16th day of May, 1917.

JEREMIAH L. MAHONEY.